(12) United States Patent
Maier et al.

(10) Patent No.: US 7,265,178 B2
(45) Date of Patent: Sep. 4, 2007

(54) POLYURETHANE-POLYMER HYBRID-DISPERSION WITH ENHANCED SURFACE PROPERTIES, METHOD FOR THE PRODUCTION AND UTILIZATION THEREOF

(75) Inventors: Alois Maier, Engelsberg (DE); Stefan Ingrisch, Seebruck (DE); Norbert Steidl, Kienberg (DE); Frank Weinelt, Burgkirchen (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 10/563,903

(22) PCT Filed: Jul. 9, 2004

(86) PCT No.: PCT/EP2004/007592

§ 371 (c)(1),
(2), (4) Date: Jan. 6, 2006

(87) PCT Pub. No.: WO2005/007762

PCT Pub. Date: Jan. 27, 2005

(65) Prior Publication Data

US 2006/0189750 A1    Aug. 24, 2006

(30) Foreign Application Priority Data

Jul. 11, 2003   (DE) ................. 103 31 484

(51) Int. Cl.
C08J 3/00 (2006.01)
C08K 3/20 (2006.01)
C08L 75/00 (2006.01)
C08L 83/00 (2006.01)
C08F 8/30 (2006.01)

(52) U.S. Cl. ............... 524/507; 427/372.2; 427/385.5; 428/423.1; 524/457; 524/591; 524/588; 524/837; 524/839; 524/840; 525/123; 525/455

(58) Field of Classification Search ............... 524/507, 524/457, 591, 839, 840, 588, 837; 525/123, 525/455; 427/372.2, 385.5; 428/423.1
See application file for complete search history.

(56) References Cited

U.S. PATENT DOCUMENTS

| | | | |
|---|---|---|---|
| 4,024,278 A | 5/1977 | Henrick | |
| 4,636,545 A | 1/1987 | Konig et al. | |
| 5,039,739 A * | 8/1991 | Padget et al. | ............... 524/839 |
| 5,115,013 A | 5/1992 | Rottger et al. | |
| 5,230,962 A | 7/1993 | Stephenson | |

FOREIGN PATENT DOCUMENTS

| | | |
|---|---|---|
| DE | 3 407 362 A1 | 8/1985 |
| DE | 197 22 403 A | 12/1997 |
| EP | 0 273 449 B1 | 7/1988 |
| EP | 0 339 862 A | 11/1989 |
| EP | 0 452 774 B1 | 10/1991 |
| EP | 0 162 218 A1 | 12/2001 |
| JP | 01087670 A | 9/1993 |
| JP | 63243117 A | 9/1993 |
| JP | 10 330 683 A | 3/1999 |
| JP | 2002 186900 A | 7/2002 |
| JP | 2002-364128 A | 12/2002 |
| WO | WO-00/37518 A | 6/2000 |

* cited by examiner

*Primary Examiner*—Patrick Niland
(74) *Attorney, Agent, or Firm*—Fulbright & Jaworski L.L.P.

(57) ABSTRACT

A description is given of an optionally fluorinated polyurethane-polymer hybrid dispersion with enhanced surface properties (low critical surface tensions $\gamma_c$ and very high contact angles $\theta$) which is obtainable by
a) preparing a dispersion component (binder) based on an aqueous solution or dispersion of an optionally hydroxy- and/or amino-functional polyurethane-polymer hybrid having optionally fluorinated side chains
and, if desired,
b) subsequently reacting the dispersion component from stage a) with a crosslinker component (D).

The polyurethane-polymer hybrid dispersion of the invention can be prepared in solvent-free or low-solvent fashion and with high solids content and requires only a very low level of stabilizing groups.

25 Claims, No Drawings

POLYURETHANE-POLYMER HYBRID-DISPERSION WITH ENHANCED SURFACE PROPERTIES, METHOD FOR THE PRODUCTION AND UTILIZATION THEREOF

This is a §371 of PCT/EP2004/007592 filed Jul. 9, 2004, which claims priority from German Patent Application No. 103 31 484.9 filed Jul. 11, 2003.

The present invention relates to a polyurethane-polymer hybrid dispersion with enhanced surface properties, a method of preparing it, and its utilization.

(Fluorine-modified, aqueous) polymers are becoming more and more important because of their unique surface properties (water- and oil-repellent) and are hence predestined for utilization as soil-repellent coating systems. This is demonstrated not least by the host of references published in recent times on this topic (R. Winter, P. G. Nixon, R. J. Terjeson, J. Nohtasham, N. R. Holcomb, D. W. Grainger, D. Graham, D. G. Castner, G. L. Gard, J. Fluorine Chem., 2002, 115(2), 107-113; R. D. van de Grampel, W. Ming, J. Laven, R. van der Linde, F. A. M. Leermakers, Macromol., 2002, 35(14), 5670-5680; V. Castelvetro, M. Aglietto, F. Ciardelli, O. Chiantore, M. Lazzari, L. Toniolo, J. Cot. Technol., 2002, 74, 57-66).

Water-based copolymer dispersions and emulsions based on monomers containing perfluoroalkyl groups have been known for some time already. They serve to impart water and oil repellency to textiles and carpets in particular, both alone and in conjunction with further textile assistants, provided the perfluoroalkyl groups are linear and contain at least 6 carbon atoms.

To prepare these copolymer dispersions and emulsions by emulsion polymerization, different emulsifier systems are used, and in accordance with the emulsifier system used the copolymer dispersions and emulsions obtained are stabilized anionically or cationically and have different performance properties.

Aqueous dispersions of graft copolymers containing perfluoroalkyl groups and their use as water repellents and oil repellents have been known from the patent literature for some time already.

EP 0 452 774 A1 and DE 34 07 362 A1 describe a process for preparing aqueous dispersions of copolymers and/or graft copolymers of ethylenically unsaturated perfluoroalkyl monomers and non-fluorine-modified, ethylenically unsaturated monomers, with aqueous, emulsifier-free polyurethane dispersions having been used as the graft base.

DE 36 07 773 C2 describes polyurethanes which contain perfluoroalkyl ligands and which are used in the form of an aqueous dispersion, but using external emulsifiers, or in the form of a solution in an organic solvent (mixture) exclusively for finishing textile materials and leather.

Polyurethanes containing perfluoroalkyl groups and intended for the oil-repellent and water-repellent finishing of textiles are also described in patent documents DE 14 68 295 A1, DE 17 94 356 A1, DE 33 19 368 A1, EP 0 103 752 A1, U.S. Pat. Nos. 3,398,182 B1, 3,484,281 B1, and 3,896,251 B1. These compounds, however, necessitate large amounts for the application and exhibit inadequate adhesion to the substrate.

WO 99/26 992 A1 describes aqueous fluorine- and/or silicone-modified polyurethane systems having low surface energies, which cure to water- and solvent-stable, hard polyurethane films having antifouling properties, the following two perfluoroalkyl components being disclosed:

with $R_f$=perfluoroalkyl group having 1-20 carbon atoms and $R_h$=alkyl group having 1-20 carbon atoms, and

with $R_f$=$C_4$-$C_6$ fluoroalkyl, $R'_f$=$C_1$-$C_3$ fluoroalkyl, and R=$C_1$-$C_2$ alkyl.

Water-dispersible sulfo-polyurethane or sulfo-polyurea compositions with low surface energy, specifically for ink-accepting coatings, are described in EP 0 717 057 B1, the hydrophobic segments being composed of polysiloxane segments or of a saturated fluoroaliphatic group having 6-12 carbon atoms of which at least 4 are fully fluorinated.

Aqueous dispersions of water-dispersible polyurethanes having perfluoroalkyl side chains, without the use of external emulsifiers, are known from EP 0 339 862 A1. The isocyanate-reactive component used here was a fluorinated polyols which had been obtained by free radical addition of a polytetramethylene glycol with a fluorinated olefin (see EP 0 260 846 B1). The polyurethane dispersions obtained, however, consistently possess solids contents of less than 30% by weight and, furthermore, require considerable amounts of hydrophilic component. The surface energies of the dried films still amount to >30 dyne cm$^{-1}$.

U.S. Pat. No. 4,636,545 describes aqueous polyurethane dispersions, with blocked polyisocyanates that if desired are emulsified therein, as a graft base for the free-radical grafting of a polymer of unsaturated perfluoroalkyl monomers (M>367 daltons) and, if desired, unsaturated comonomers (in solvent or aqueous emulsion) for the water and oil repellency treatment of textiles, natural and synthetic fibers, paper, and leather. The solids content amounts to 5% to 50% by weight, preferably 10% to 30% by weight, and the fluorine content to 6% to 50% by weight, preferably 10% to 30% by weight. The fluorinated side chain is not incorporated as a monomer into the PU main chain but instead is grafted free-radically as an unsaturated fluorine compound onto the main chain of an existing PU dispersion. For that purpose the unsaturated compound is added in the form of an emulsion (containing solvent) to the polyurethane dispersion.

U.S. Pat. No. 5,703,194 describes the cationic polymerization of oxetane monomers having perfluorinated alkoxy side chains for preparing hydroxy-functional prepolymers. No aqueous systems are disclosed, though. Because of the polyether main chain, the systems are not UV-stable.

EP 1 162 220 A1 describes cationic polyurethane dispersions which are thermally postcrosslinkable. The perfluoro polyethers used are incorporated as a diol or monool component into the main chain. The molecular masses of the polyurethanes are less than or equal to 9000 daltons.

WO 02/04 538 discloses systems in which perfluoroalkyl side chains are introduced via perfluorooxetanepolyol copolymers. Because of the polyether main chain, the systems are not UV-stable.

JP 09118843 describes water-based compositions comprising fluorine-modified phosphoric ester salts and a low molecular mass urethane compound having one or more perfluoroalkyl radicals for preventing discolorations on the surface of seals at butt joints. This patent application does not concern a PU polymer coating.

The object on which the present invention is based was therefore that of developing an optionally fluorine-modified polyurethane-polymer hybrid dispersion having improved surface properties for the permanent oil- and water-repellent surface treatment or modification of mineral and nonmineral substrates for a variety of areas of application, said dispersion not having the stated disadvantages of the prior art but instead possessing good performance properties and at the same time being preparable with an eye to environmental, economic, and physiological considerations.

This object has been achieved in accordance with the invention through the provision of a polyurethane-polymer hybrid dispersion prepared by a) preparing a dispersion component or binder component based on an aqueous solution or dispersion of an optionally hydroxy- and/or amino-functional polyurethane-polymer hybrid having fluorinated or unfluorinated side chains, where $a_1$) 5 to 100 parts by weight of an optionally laterally fluorine-modified, anionically stabilized polyurethane base dispersion (A) having preferably an ideally linearly segmented structure, a polymer-bonded fluorine content of 0 to 5% by weight, a hydroxyl number and/or amine number of 0 to 250 mg KOH/g, a solids content of 20% to 60% by weight, a solvent content of 0 to 20% by weight, and an average molar mass of 5000 to 100 000 daltons are admixed with 3 to 300 parts by weight of a monomer component (B) consisting of (i) 1 to 100 parts by weight of one or more unsaturated monomers (B)(i) having one or more free-radically polymerizable double bonds, selected from the groups of acrylic acid and its derivatives and/or methacrylic acid and its derivatives and/or styrene and its derivatives and/or (ii) 1 to 100 parts by weight of one or more unsaturated fluorine-modified monomers (B)(ii) having one or more free-radically polymerizable double bonds, selected from the groups of alkyl (per)fluoro(meth) acrylates and/or (per)fluoroalkyl (meth)acrylates and/or (per) fluoroalkyl (per) fluoro(meth)acrylates and/or reaction products of 1-(1-isocyanato-1-methylethyl)-3-(2-propenyl)benzene (m-TMI) and perfluoroalkyl alcohols and/or (iii) 1 to 100 parts by weight of one or more unsaturated (optionally fluorine-modified) monomers (B)(iii) having one or more free-radically polymerizable double bonds, selected from the group of polyhedral oligomeric polysilsesquioxanes (POSS) of the general formula $(RSiO_{1.5})_n$ with n=4, 6, 8, 10, 12 and R=any organic radical having 1 to 100 C atoms and 0 to 50 N and/or O and/or F and/or Si and/or S atoms and a molar mass of 250 to 25 000 daltons, with 0.01 to 10 parts by weight of an initiator component (C), consisting of at least one lipophilic free-radical initiator having one or more thermally labile azo or peroxo groups, and 0 to 200 parts by weight of water, it being possible for the monomer component (B), the initiator component (C), and the water to be metered in simultaneously, successively or in a mixture to the polyurethane base dispersion (A), and subsequently $a_2$) in the reaction mixture from stage $a_1$), as a result of the thermal decomposition of component (C), carrying out a free-radical polymerization of component (B) within the micelles of the polyurethane base dispersion (A), and, if desired, b) subsequently reacting the dispersion or binder component formed from components (A) to (C) from stage $a_2$) with 20 to 100 parts by weight of a crosslinker component or curing agent (D), use being made as crosslinker component or curing agent (D) of water-dispersible (paint) polyisocyanates having aliphatically and/or cycloaliphatically and/or aromatically attached isocyanate groups, it being possible for these polyisocyanates to contain 0 to 25% by weight of an organic solvent.

Surprisingly it has been found that through the use of appropriate (combinations of) fluorinated monomers in the polyurethane-polymer hybrid dispersions it is possible to obtain not only hard coating systems and surfaces having very low critical surface tensions $\gamma_c$ (lower than Teflon®, with 18.6 mN/m) and very high contact angles θ (in the range of Teflon®, with 111°) but also that these coating systems and surfaces, furthermore, exhibit a dirt pickup tendency which is significantly reduced as compared with the known prior art. This profile of properties is achieved even with very low fluorine contents (0.5% to 2.0% by weight, based on resin solids) and with very small amounts of fluorinated monomers. The decisive factor for this profile is that the polyurethane-polymer hybrid dispersions contain covalently bonded fluorinated side chains which can be introduced via the polyurethane base dispersion and/or via free-radically polymerizable monomers. Moreover, it was not foreseeable that the optionally fluorine-modified polyurethane-polymer hybrid dispersions could additionally be prepared in solvent-free or low-solvent fashion and with high solids contents, and would require only a very low level of stabilizing groups.

The polyurethane-polymer hybrid dispersion of the invention, with enhanced surface properties, is defined by its multistage preparation method. In reaction stage a), first of all, an aqueous solution or dispersion of an optionally hydroxy- and/or amino-functional polyurethane-polymer hybrid (binder) is prepared, which then, if desired, in reaction stage b), is reacted further with a crosslinker component (curing agent).

In reaction stage $a_1$) 5 to 100 parts by weight of an optionally laterally fluorine-modified anionically stabilized polyurethane base dispersion (A) having preferably an ideally linearly segmented structure, a polymer-bonded fluorine content of 0 to 5% by weight, a hydroxyl number and/or amine number of 0 to 250 mg KOH/g, a solids content of 20% to 60% by weight, a solvent content of 0 to 20% by weight, and an average molar mass of from 5000 to 100 000 daltons are admixed with a mixture of 3 to 300 parts by weight of a monomer component (B), consisting of 1 to 100 parts by weight of one or more unsaturated monomers (B)(i) having one or more free-radically polymerizable double bonds, selected from the groups of acrylic acid and its derivatives and/or methacrylic acid and its derivatives and/or styrene and its derivatives, and/or 1 to 100 parts by weight of one or more unsaturated fluorine-modified monomers (B)(ii) having one or more free-radically polymerizable double bonds, selected from the groups of alkyl (per)fluoro (meth)acrylates and/or (per)fluoroalkyl (meth)acrylates and/or (per) fluoroalkyl (per) fluoro(meth)acrylates and/or reaction products of 1-(1-isocyanato-1-methylethyl)-3-(2-propenyl)benzene (m-TMI) and perfluoroalkyl alcohols, and/or 1 to 100 parts by weight of one or more unsaturated (optionally fluorine-modified) monomers (B)(iii) having one or more free radically polymerizable double bonds, selected from the group of polyhedral oligomeric polysilsesquioxanes (POSS) of the general formula $(RSiO_{1.5})_n$ with n=4, 6, 8, 10, 12 and R=any organic radical having 1 to 100 C atoms and 0 to 50 N and/or 0 to 50 O and/or 0 to 50 F and/or 0 to 50 Si and/or 0 to 50 S atoms and a molar mass of 250 to 25 000 daltons, and 0.01 to 10 parts by weight of an initiator component (C), consisting of at least one lipophilic free-radical initiator having one or more thermally labile azo or peroxo groups, and also 0 to 200 parts by weight of water, it being possible for monomer component (B), initiator component (C), and the water to be metered in simultaneously, successively or in a mixture to the polyurethane base dispersion (A), and reacted to give a (fluorine-modified) polyurethane-polymer hybrid dispersion.

As component (A) it is preferred to use optionally hydroxy- and/or amino-functionalized polyurethane dispersions based on (hydrophobically modified) polyalkylene glycols, aliphatic or aromatic polyesters, polycaprolactones, polycarbonates, α,ω-polybutadiene-polyols, α,ω-polymethacrylatediols, α,ω-dihydroxyalkylpolydimethylsiloxanes, macromonomers, telecheles, hydroxy-functional epoxy resins, oxidatively drying alkyd resins based on bisepoxides and unsaturated fatty acids, hydroxy-functional polysulfides or mixtures thereof.

Particularly suitable are polyurethane dispersions containing as structural groups laterally fluorine-modified macromonomers based on reaction products of perfluoroalkyl alcohols, diisocyanates, and diethanolamine, use being made preferably of perfluoroalkyl alcohols having terminal methylene groups (hydrocarbon spacers) of the general formula $$CF_3-(CF_2)_x-(CH_2)_y-OH,$$

with x=3-20 and y=1-6 or hexafluoropropene oxide (HFPO) oligomer alcohols of the general formula $$CF_3CF_2CF_2O-(CF(CF_3)CF_2O)_z-CF(CF_3)CH_2-OH$$

with z=1-10 or else mixtures of these, and/or perfluoroalkylalkenes and diethanolamine, use being made preferably of perfluoroalkylalkenes having terminal methylene groups (hydrocarbon spacers) of the general formula $$CF_3-(CF_2)_x-CH_2=CH_2$$

with x=3-20 or else mixtures of these, and/or alkyl (per) fluoro(meth)acrylates and/or (per) fluoroalkyl (meth)acrylates and/or (per)fluoroalkyl (per)fluoro(meth)acrylates and diethanolamine and/or (per)fluoroalkylalkylene oxides and N-methylethanolamine or diethanolamine.

In one particularly preferred embodiment the fluorine-modified polyurethane base dispersion is prepared by means of the high solids zero VOC process (cf. EP 1 064 314 B1 and DE 102 08 567 A1). This process represents a universal method of preparing tailor-made polyurethane dispersions. The low level of technical requirements of the process and the complete renunciation of volatile and/or nonvolatile organic solvents allow high space/time yields in conjunction with low costs. The performances of the polyurethane dispersions of the invention in terms of freedom from solvent, solids content, and material properties are remarkable. Also deserving of emphasis are the simplicity and reproducibility of the process and also the storage stability of the products. On the basis of their preparation process, these polyurethane dispersions and/or the polyurethane-polyurea polymers have an ideally linearly segmented structure. The ideally linearly segmented structure of the polyurethane polymers results intermolecularly in a very pronounced and regular domain structure of hard segments and soft segments. Hard segments are composed of structural elements with rigid urethane and urea groups and also short-chain diols, which exert a strong intercatenary interaction. Soft segments are composed of flexible structural elements having carbonate, ester and ether groups, which exert a weak intercatenary interaction.

The effect of the term "ideally linearly segmented polyurethane-polyurea polymers" is that a) through the two-stage preparation process for the polyurethane prepolymer, almost exclusively, symmetrical 2:1 adducts are formed from 2 mol of polyisocyanate and 1 mol of polyol, the polyols reacting with the more reactive secondary isocyanate groups and the 2:1 adducts containing terminal primary isocyanate groups, b) through the two-stage preparation process for the polyurethane prepolymer the formation of oligourethanes is suppressed, which in the case of a comparatively low overall amount of carboxyl and/or carboxylate groups (DMPA) and/or of the sulfonic acid and/or sulfonate groups would lead to an unsymmetrical distribution of charge density within the polyurethane-polyurea polymer, c) the 2:1 adducts of 2 mol of polyisocyanate and 1 mol of polyol possess three structural units, which are linked to one another via two urethane groups, d) either two of the 2:1 adducts of 2 mol of polyisocyanate and 1 mol of polyol are linked via further structural units and via one or two urea groups (chain extension with difunctional amine or water, accompanied by elimination of $CO_2$) or else one 2:1 adduct of 2 mol of polyisocyanate and 1 mol of polyol is linked, toward the polymer chain, via further structural units (see below) and via one or two urea groups (chain extension with difunctional amine or water, accompanied by elimination of $CO_2$) and is linked, toward the polymer end, via further structural units and via a urea group (chain termination with monofunctional amine and/or water, accompanied by elimination of $CO_2$), e) through the chain extension and, if appropriate, chain termination, and also through the reaction of the remaining NCO groups with water, linear segment polymers having excellent mechanical properties are formed, g) a uniform distribution of the carboxyl and/or carboxylate groups (DMPA) and/or of the sulfonic acid and/or sulfonate groups is produced, f) the sequence of the chain extenders is immaterial to achieving the excellent mechanical properties, and hence a regular sequence is obtained through the succession of the defined and symmetrical 2:1 adducts of 2 mol of polyisocyanate and 1 mol of polyol over the entire polyurethane-polyurea polymer.

Given an appropriate operating regime, the excellent material properties of the (fluorine-modified) polyurethane dispersions are carried over to the (fluorine-modified) polyurethane-polymer hybrid dispersions. Depending on the choice of the (fluorine-modified) polyurethane dispersions and of the (fluorine-modified) monomer component, it is possible to vary elongation, and elongation in conjunction with tensile strength, over wide ranges almost arbitrarily.

As component (B)(i), use is made of at least one monomer having one or more free-radically polymerizable double bonds, such as acrylic acid and its derivatives and/or methacrylic acid and its derivatives and/or styrene and its derivatives. Preference is given to using acrylic acid, acrylic anhydride, acrylamide, dimethylacrylamide, acrylonitrile, methyl acrylate, ethyl acrylate, vinyl acrylate, propyl acrylate, isopropyl acrylate, butyl acrylate, isobutyl acrylate, tert-butyl acrylate, hexyl acrylate, cyclohexyl acrylate, octyl acrylate, 2-ethylhexyl acrylate, 3,3,5-trimethylhexyl acrylate, dodecyl acrylate, isododecyl acrylate, octadecyl acrylate, and also 2-hydroxyethyl acrylate, hydroxypropyl acrylate (isomer mixture), 2-(dimethylamino)ethyl acrylate, 3-(dimethylamino)propyl acrylate, 3-sulfopropyl acrylate potassium salt; methacrylic acid, methacrylic anhydride, methacrylamide, dimethylmethacrylamide, methacrylonitrile, methyl methacrylate, ethyl methacrylate, vinyl methacrylate, propyl methacrylate, isopropyl methacrylate, butyl methacrylate, isobutyl methacrylate, tert-butyl methacrylate, hexyl methacrylate, cyclohexyl methacrylate, octyl methacrylate, 2-ethylhexyl methacrylate, dodecyl methacrylate, isododecyl methacrylate, octadecyl methacrylate, benzyl methacrylate and also 2-hydroxyethyl methacrylate, hydroxypropyl methacrylate (isomer mixture), 2-(dimethylamino) ethyl methacrylate, 2,3-epoxypropyl methacrylate, 2-(acetoacetoxy)ethyl methacrylate, 3-sulfopropyl methacrylate potassium salt, dimethyl[2-(methacryloyloxy)ethyl](3-sulfopropyl)ammonium betaine, dimethyl[3-(methacryloylamino)propyl](3-sulfopropyl)ammonium betaine, 2-acrylamido-2-methylpropane-1-sulfonic acid (AMPS®) and its salts, styrene, methylstyrene, ethylstyrene, divinylbenzene, and styrenesulfonic acid, sodium salt. In addition it is also possible to use (meth)acrylic esters with a free-radically polymerizable double bond based on methoxypolyethylene glycol, (meth)acrylic esters with two or more free-radically polymerizable double bonds based on low molecular mass and/or high molecular mass polymeric polyols. Likewise suitable in principle are vinyl halides such as vinyl chloride, vinyl esters such as vinyl acetate, 1,3-butadiene, isoprene, and maleic anhydride and its derivatives. Particular preference is given to combinations of 5% to 95% by weight of methyl methacrylate and 5% to 95% by weight of n-butyl acrylate.

As component (B)(ii) use is made of at least one fluorine-modified monomer having one or more free-radically polymerizable double bonds, such as alkyl (per) fluoro(meth) acrylates and/or (per) fluoroalkyl (meth)acrylates and/or (per) fluoroalkyl (per) fluoro(meth)acrylates and/or reaction products of 1-(1-isocyanato-1-methylethyl)-3-(2-propenyl) benzene (m-TMI) and perfluoroalkyl alcohols. Preference is given to using 1H,1H,7H-dodecafluoroheptyl acrylate, 1H,1H,9H-hexadecafluorononyl acrylate, 1H,1H,3H-hexafluorobutyl acrylate, 1H,1H,5H-octafluoropentyl acrylate, 2,2,3,3,3-pentafluoropropyl acrylate, 2-(perfluorobutyl) ethyl acrylate, 3-(perfluorobutyl)-2-hydroxypropyl acrylate, 2-(perfluorodecyl)ethyl acrylate, 2-(perfluorohexyl)ethyl acrylate, 3-perfluorohexyl-2-hydroxypropyl acrylate, 2-(perfluoro-3-methylbutyl)ethyl acrylate, 3-(perfluoro-3-methylbutyl)-2-hydroxypropyl acrylate, 2-(perfluoro-5-methylhexyl)ethyl acrylate, 3-(perfluoro-5-methylhexyl)-2-hydroxypropyl acrylate, 2-(perfluoro-7-methyloctyl)ethyl acrylate, 3-(perfluoro-7-methyloctyl)-2-hydroxypropyl acrylate, 2-(perfluorooctyl)ethyl acrylate, 3-perfluorooctyl-2-hydroxypropyl acrylate, 1H,1H,3H-tetrafluoropropyl acrylate, 2,2,2-trifluoroethyl acrylate, 1H-1-(trifluoromethyl)trifluoroethyl acrylate, 1H,1H,7H-dodecafluoroheptyl methacrylate, 3,3,4,4,5,5,6,6,7,7,8,8,9,9,10,10,10-heptadecafluorodecyl methacrylate, 1H,1H,9H-hexadecafluorononyl methacrylate, 1H,1H,3H-hexafluorobutyl methacrylate, 1H,1H,5H-octafluoropentyl methacrylate, 2,2,3,3,3-pentafluoropropyl methacrylate, 2-(perfluorobutyl)ethyl methacrylate, 3-(perfluorobutyl)-2-hydroxypropyl methacrylate, 2-(perfluorodecyl)ethyl methacrylate, 2-(perfluorohexyl)ethyl methacrylate, 3-perfluorohexyl-2-hydroxypropyl methacrylate, 2-(perfluoro-3-methylbutyl)ethyl methacrylate, 3-(perfluoro-3-methylbutyl)-2-hydroxypropyl methacrylate, 2-(perfluoro-5-methylhexyl)ethyl methacrylate, 3-(perfluoro-5-methylhexyl)-2-hydroxypropyl methacrylate, 2-(perfluoro-7-methyloctyl)ethyl methacrylate, 3-(perfluoro-7-methyloctyl)-2-hydroxypropyl methacrylate, 2-(perfluorooctyl)ethyl methacrylate, 3-perfluorooctyl-2-hydroxypropyl methacrylate, 1H,1H,3H-tetrafluoropropyl methacrylate, 3,3,4,4,5,5,6,6,7,7,-8,8,8-tridecafluorooctyl methacrylate, 2,2,2-trifluoroethyl methacrylate and 1H-1-(trifluoromethyl)trifluoroethyl methacrylate. Particular preference is given to (per)fluoroalkyl methacrylates.

As component (B)(iii) use is made of at least one (optionally fluorine-modified) monomer having one or more free-radically polymerizable double bonds, such as polyhedral oligomeric polysilsesquioxanes (POSS) of the general formula $(RSiO_{1.5})_n$ with n=4, 6, 8, 10, 12 and R=any organic radical having 1 to 100 C atoms and 0 to 50 N and/or 0 to 50 O and/or 0 to 50 F and/or 0 to 50 Si and/or 0 to 50 S atoms.

Silsesquioxanes are oligomeric or polymeric substances whose completely condensed representatives possess the general formula $(SiO_{3/2}R)_n$, with n>4 and the radical R possibly being a hydrogen atom, though it usually represents an organic radical. The smallest structure of a silsesquioxane is the tetrahedron. Voronkov and Lavrent'yev (Top. Curr. Chem. 102 (1982), 199-236) describe the synthesis of completely condensed and incompletely condensed oligomeric silsesquioxanes by hydrolytic condensation of trifunctional $RSiY_3$ precursors, where R is a hydrocarbon radical and Y is a hydrolyzable group, such as chloride, alkoxide or siloxide, for example. Lichtenhan et al. describe the base-catalyzed preparation of oligomeric silsesquioxanes (WO 01/10871). Silsesquioxanes of the formula $R_8Si_8O_{12}$ (with like or different hydrocarbon radicals R) can be reacted under base catalysis to give functionalized, incompletely condensed silsesquioxanes, such as $R_7Si_7O_9(OH)_3$ or else $R_8Si_8O_{11}(OH)_2$ and $R_8Si_8O_{10}(OH)_4$ (Chem. Commun. (1999), 2309-10; Polym. Mater. Sci. Eng. 82 (2000), 301-2; WO 01/10871) and may therefore serve as a parent compound for a multiplicity of different incompletely condensed and functionalized silsesquioxanes. In particular the silsesquioxanes (trisilanols) of the formula $R_7Si_7O_9(OH)_3$ can be converted by reaction with functionalized, monomeric silanes (corner capping) into oligomeric silsesquioxanes modified accordingly.

Preference is given to using polyhedral oligomeric polysilsesquioxanes (POSS) of the general formula $(RSiO_{1.5})_8$ with R=methacryloyloxypropyl and optionally $CH_2CH_2CF_2CF_2CF_2CF_2CF_2CF_3$ and/or H and/or $C_1$-$C_{25}$ alkyl and/or $C_3$-$C_{25}$ cycloalkyl and/or $C_6$-$C_{30}$ aryl and/or $(CH_2)_3(OCH_2CH_2)_n OMe$ and/or aminopropyl and/or epoxypropyl and/or dimethoxysilyloxy and/or isocyanatopropyl and/or triethoxysilylpropyl. Polyhedral oligomeric polysilsesquioxanes (POSS) to be regarded with particular preference are those of the general formula $(RSiO_{1.5})_8$ with R=methacryloyloxypropyl and optionally $CH_2CH_2CF_2CF_2CF_2CF_2CF_2CF_3$ and/or alkyl.

Within the bounds of the present invention, however, it is also possible to use, as component (B)(iii), reactive polyhedral oligomeric polysilsesquioxanes (POSS) of the general formula $(R_a X_b SiO_{1.5})_m$ where a=0 or 1, b=0 or 1, a+b=1, m=2, 6, 8, 10, 12, and R=hydrogen atom, alkyl, cycloalkyl, alkenyl, cycloalkenyl, alkynyl or cycloalkynyl group or polymer unit, each of which are substituted or unsubstituted, or further functionalized polyhedral oligomeric silicon-oxygen cluster units, which are attached via a polymer unit or a bridging unit, X=oxy, hydroxy, alkoxy, carboxy, silyl, alkylsilyl, alkoxysilyl, siloxy, alkylsiloxy, alkoxysiloxy, silylalkyl, alkoxysilylalkyl, alkylsilylalkyl, halogen, epoxy, ester, fluoroalkyl, isocyanate, blocked isocyanate, acrylate, methacrylate, nitrile, amino, phosphine or polyether group or substituents of type R containing at least one such group of type X, and the substituents of type R and also the substituents of type X being identical or different.

As component (C) use is made of at least one lipophilic free-radical initiator having one or more thermally labile azo or peroxo groups, said initiator having a half-life of one hour at a decomposition temperature in the range from 40 to 120° C. Preference is given to using inorganic peroxides such as ammonium peroxodisulfate, sodium peroxodisulfate, potassium peroxodisulfate, hydrogen peroxide, organic peroxides such as percarbonates, diacyl peroxides such as dibenzoyl peroxide, alkyl peroxides, such as tert-butyl hydroperoxide, cumene hydroperoxide, dialkyl peroxides such as di-tert-butyl peroxide, acyl alkyl peroxides such as tert-butyl peroxybenzoate, and azo initiators such as 2,2'-azobis(2-methylbutyronitrile), 2,2'-azobis(2-methylpropionitrile) or 2,2'-azoisobutyronitrile. Particular preference is given to free-radical initiators which at a decomposition temperature of 70 to 90° C. have a half-life of 1 hour, particularly 2,2'-azobis (2-methylbutyronitrile) and/or 2,2'-azobis (2-methylpropionitrile).

The initiator/monomer molar ratio of components (B) and (C) is set in a range from 0.001 to 0.05.

Reaction stage $a_1$) is carried out at a temperature of 15 to 35° C., preferably at 20 to 30° C.

For the further implementation of this method, employing the techniques customary for polymerizations, in reaction stage $a_2$) a free-radical polymerization of component (B) is carried out within the micelles of the polyurethane base dispersion (A) in the reaction mixture from stage $a_1$), by means of the thermal decomposition of component (C).

To prepare polyurethane-polymer hybrid dispersions it is usual in the art to use the process frequently referred to in the literature as in situ polymerization, in its various versions.

Version A (Batch Process)

The monomers are introduced individually or in a mixture, prior to the free-radical polymerization, in their entirety into the polyurethane base dispersion.

Version B (Seed-Feed Process)

The monomers are introduced individually or in a mixture, during the free-radical polymerization, continuously, into the polyurethane base dispersion.

Version C (Combination of Batch Process and Seed-Feed Process

One portion of the monomers is introduced individually or in a mixture, prior to the free-radical polymerization, into the polyurethane base dispersion and the remainder of the monomers is introduced, individually or in a mixture, during the free-radical polymerization, continuously, into the polyurethane base dispersion.

The initiator can be added together with the monomers or separately. Normally the initiator is dissolved in the monomers or in the monomer mixture before the free-radical polymerization or is dissolved in the polyurethane base dispersion to which monomer or monomer mixture has been added.

The water serves to adjust the solids content and can be added before the monomers or the monomer mixture are or is added and/or together with the monomers or monomer mixtures (preemulsion) and/or after the free-radical polymerization.

The advantage of this preparation method is that monomers and initiator can be added together at room temperature and that no additional (external) emulsifiers whatsoever are necessary to stabilize them in the polyurethane dispersion. The monomers and the initiator are emulsified by the micelles of the polyurethane dispersion. In the course of the free-radical polymerization an interpenetrating network of polyurethane resins and polymer resins is formed within the micelles, these resins being connected to one another by physical crosslinking. Hybridization is normally accompanied by a considerable reduction in the charge density or the number of carboxylate groups in the polyurethane-polymer hybrid [meq·(100 g)$^{-1}$]. The charge density of the micelles of the polyurethane dispersion and/or of the anionically modified polyurethane polymers is sufficiently large in any case to be able to provide additional, adequate stabilization both of the monomers and of the polymers prepared from the monomers.

The emulsion polymerization in reaction stage $a_2$) is preferably carried out without further emulsifiers. After the end of polymerization the finished fluorine-modified polyurethane-polymer hybrid dispersion in one preferred embodiment is cooled and filtered through a 100 μm sieve, with any hardened foam that may be present being separated off completely in this procedure. The storage stability of the polyurethane-polymer hybrid dispersions amounts to at least one year.

Reaction stage $a_2$) is carried out with a temperature difference of ±10° C. relative to the temperature at which component (C) has a half-life of 1 hour. Preferably reaction stage $a_2$) is carried out at a temperature of 80+10° C. when using 2,2'-azobis(2-methylbutyronitrile) and/or 2,2'-azobis (2-methyl-propionitrile) as component (C).

The amount of carboxylate and/or sulfonate groups in the anionically modified polyurethane hybrid polymer formed from components (A) to (C) is set at 5 to 25 meq·(100 g)$^{-1}$, preferably at 10 to 20 meq·(100 g)$^{-1}$, and the acid number at 2.5 to 15 meq KOH·g$^{-1}$, preferably at 5 to 12.5 meq KOH·g$^{-1}$.

The solids content in terms of (fluorine-modified) polyurethane-polymer hybrid consisting of components (A) to (C) is set at 30% to 70% by weight, preferably at 40% to 60% by weight, based on the total amount of the (fluorine-modified) polyurethane-polymer hybrid dispersion.

The ratio of the proportional solids contents of (fluorine-modified) polyurethane resin from component (A) and (fluorine-modified) polymer resin from components (B) and (C) is set preferably at 20%:80% to 80%:20% by weight, preferably at 40%:60% to 60%:40% by weight.

The (fluorine-modified) polyurethane-polymer hybrid dispersions contain less than 10% by weight of organic solvents, these being introduced predominantly through the polyurethane base dispersion. In order to enhance the filming and/or coalescence of the (fluorine-modified) polyurethane-polymer hybrid dispersion it is possible during or after the preparation in accordance with reaction stages $a_1$) and $a_2$) to insert further organic solvents and/or coalescence assistants such as N-methylpyrrolidone, glycol ethers such as dipropylene glycol dimethyl ether (Proglyde DMM®) and cyclic alkylene carbonates. Preferably the (fluorine-modified) polyurethane-polymer hybrid dispersion contains less than 10% by weight of organic solvents. In one particularly preferred embodiment the (fluorine-modified) polyurethane-polymer hybrid dispersion is in solvent-free form.

The average particle sizes of the (fluorine-modified) polyurethane-polymer hybrid dispersions formed from components (A) to (C) amount to 50 to 500 nm, preferably 100 to 400 nm.

The average molecular masses (number average) of the (fluorine-modified) polyurethane-polymer hybrid dispersions formed from components (A) to (C) amount to 50 000 to 500 000 daltons.

The residual monomer content amounts to less than 0.1% by weight, based on the total amount of the (fluorine-modified) polyurethane-polymer hybrid dispersion.

The pure polymer formed from components (B) and (C) in reaction stage $a_2$) has a preferred glass transition temperature of −50 to +100° C., in particular −25 to +25° C. The calculation is made by means of the Fox equation.

If desired, in the subsequent reaction stage b), the dispersion component (binder) formed from components (A) to (C), from stage $a_2$), is reacted with 20 to 100 parts by weight of a crosslinker component or curing agent (D), the crosslinker component (D) used being water-dispersible (paint) polyisocyanates having aliphatically and/or cycloaliphatically and/or aromatically attached isocyanate groups, and possibly containing 0 to 25% by weight of an organic solvent. The ratio of crosslinker component (D) to binder component formed from components (A) to (C) is 1:3 to 1:5. Following application, a highly crosslinked, fluorine-modified polyurethane coating system is obtained which features enhanced chemical resistance.

As the crosslinker component (D) use is made of water-dispersible polyisocyanates having aliphatically and/or cycloaliphatically and/or aromatically attached isocyanate groups and containing 0 to 25 parts by weight of an organic solvent. The aliphatic polyisocyanates are preferred over their aromatic counterparts. Suitability is possessed in particular by the "paint polyisocyanates", sufficiently well known in polyurethane chemistry, based on bis(4-iso-cyana-tocyclohexyl)methane ($H_{12}$MDI), 1,6-diisocyanato-hexane (HDI), 1-isocyanato-5-isocyanatomethyl-3,3,5-trimethylcyclohexane (IPDI) or combinations thereof. The term "paint polyisocyanates" denotes allophanate-, biuret-, carbodiimide-, isocyanurate-, uretdione- and/or urethane-group-containing derivatives of these diisocyanates, in which the residual monomeric diisocyanate content has been reduced to a minimum in accordance with the prior art. In addition it is also possible to use hydrophilically modified polyisocyanates, which are obtainable, for example, by reacting "paint polyisocyanates" with polyethylene glycol. Suitable polyisocyanates which can be used include, for example, commercially customary HDI isocyanurates without (trade name Rhodocoat WT 2102, Rhodia AG) or with hydrophilic modification (trade name Basonat P LR 8878, BASF AG, trade name Desmodur DA or Bayhydur 3100 from Bayer AG). Preference is given to aliphatic polyisocyanates without permanent hydrophilic modification.

To prepare the ready-to-use aqueous highly crosslinked two-component polyurethane coating composition the crosslinker component (D) ("curing agent", part B) is mixed shortly before processing into the binder component comprising components (A) to (C) ("stock varnish", part A). In order to achieve trouble-free emulsification it is advisable to dilute the polyisocyanates with small amounts of organic solvents such as, for example, dipropylene glycol dimethyl ether (Proglyde DMM®), butyl (di)glycol acetate or butyl acetate. In the majority of cases, simple emulsifying technologies, with for example a mechanical agitator (mechanical drill with stirrer), or simple mixing of both components by hand, are sufficient to ensure homogeneous distribution of the polyisocyanate droplets in the binder component. The amounts of the binder component and of the crosslinker component are calculated such that the NCO/(OH+$NH_{(2)}$) equivalent ratio of the isocyanate groups of the crosslinker component to the hydroxyl and/or amino groups of the binder component is set at 1.1 to 1.6, preferably 1.2 to 1.4.

In this way, by virtue of a high crosslinking density in conjunction with a high hardness, it is possible to obtain soil-repellent coatings having outstanding properties. This is true both in terms of processing properties and in respect of the mechanical properties, in conjunction with a very good solvent resistance and chemical resistance. Owing to the comparatively low level of hydrophilic groups in the binder component, the coatings are also distinguished by excellent water resistance.

Reaction stage b) is carried out at a temperature of 15 to 35° C., preferably at 20 to 30° C.

Although the polyurethane-polymer hybrid dispersion formulated in accordance with the invention may be employed in one-component and two-component form, the one-component form is regarded as preferred on account of its better handling properties. In the case of a two-component application the (fluorine-modified) polyurethane-polymer hybrid dispersions are used as binder component and water-emulsifiable polyisocyanates as curing component.

The present invention further provides for the use of (fluorine-modified) polyurethane-polymer hybrid dispersions with enhanced surface properties in the construction or industrial sector for the permanent oil- and water-repellent surface treatment or modification of mineral and nonmineral substrates, such as a) inorganic surfaces,
   such as porous, absorbent, rough, and polished building materials and construction materials of all kinds (such as concrete, gypsum, silica and silicates, artificial stone, natural stone (such as granite, marble, sandstone, slate, and serpentine), clay, cement, brick) and also enamels, fillers and pigments, glass, ceramic, and metals and metal alloys, b) organic surfaces,
   such as wood and woodbase materials, wood veneer, glass fiber-reinforced plastics (GRP), plastics, leather, natural fibers, polar organic polymers of all kinds, and composite materials.

The (fluorine-modified) polyurethane-polymer hybrid dispersions of the invention with enhanced surface properties, as proposed in accordance with the invention, are suitable for permanent oil- and water-repellent surface treatment or modification in the application fields of construction, such as
   antigraffiti/antisoiling coatings,
   easy to clean coatings,
   other coatings of all kinds (such as balcony coatings, roof (shingle) coatings, baking varnishes, inks and paints, masonry paints, floor coatings, light-, medium- and high-duty industrial floors, car park surfacings, sports floors),
   seals,
   prefabricated concrete components,
   concrete moldings,
   tiles and joints,
   adhesives and sealants,
   soundproofing walls,
   corrosion control, renders and decorative plasters,
exterior insulation and finishing systems (EIFS) and exterior insulation systems (EIS), and also non-construction and industrial, such as
automobile industry,
coil coatings,
baking varnishes,
glass frontages and glass surfaces,
ceramics, including sanitary ceramics,
leather dressing,
surface-modified fillers and pigments,
paper coating,
rotors of wind turbines
marine paints.

The (fluorine-modified) polyurethane-polymer hybrid dispersions of the invention with enhanced surface properties can be used for the respective fields of application in formulated or unformulated form. Examples of the formulating ingredients include defoamers, devolatilizers, lubricity and flow-control additives, dispersing additives, substrate-wetting additives, water repellents, rheology additives, coalescence assistants, matting agents, adhesion promoters, antifreeze agents, antioxidants, UV stabilizers, bactericides, fungicides, other polymers and/or polymer dispersions, fillers, pigments, and nanoparticles of all kinds, or a suitable combination thereof; the individual formulating ingredients here ought to be considered inert. The formulating ingredients can be introduced during and/or after preparation of the (fluorine-modified) polyurethane-polymer hybrid dispersions. It is in principle also possible, within formulations, to combine the (fluorine-modified) polyurethane-polymer hybrid dispersions of the invention with enhanced surface properties with aqueous or nonaqueous binders and/or to combine formulations based on the (fluorine-modified) polyurethane-polymer hybrid dispersions of the invention with enhanced surface properties with formulations based on aqueous or nonaqueous binders. The term "aqueous or nonaqueous binders" here denotes water-based polyurethanes, polymer dispersions, redispersible polymer powders, or nonaqueous, solvent-containing or solvent-free and optionally reactive polymers. To enhance the orientation of the perfluoroalkyl chains and/or to prevent the formation of micelles on the surface it is possible to use optionally fluorine-containing surfactants.

The (fluorine-modified) polyurethane-polymer hybrid dispersions of the invention with enhanced surface properties are applied using the methods known from coatings technology, such as flow coating, pouring, knife coating, rolling, spraying, brushing, dipping or roller coating, for example.

The drying and curing of the coatings produced from the (fluorine-modified) polyurethane-polymer hybrid dispersions of the invention with enhanced surface properties are generally accomplished at normal (exterior and interior) temperatures in the range from 5 to 50° C., i.e., without specific heating of the coatings, but may also take place, depending on application, at higher temperatures in the range from 50 to 150° C.

A description is given of an optionally fluorinated polyurethane-polymer hybrid dispersion with enhanced surface properties (low critical surface tensions $\gamma_c$ and very high contact angles θ) which is obtainable by a) preparing a dispersion component (binder) based on an aqueous solution or dispersion of an optionally hydroxy- and/or amino-functional polyurethane-polymer hybrid with optionally fluorinated side chains and, if desired, b) subsequently reacting the dispersion component from stage a) with a crosslinker component (D).

The polyurethane-polymer hybrid dispersion of the invention can be prepared in solvent-free or low-solvent fashion and with high solids contents and requires only a very low level of stabilizing groups.

The examples below are intended to illustrate the invention in more detail.

EXAMPLES

Example 1

The fluorine-modified polyurethane base dispersion (1) having a polymer-bonded fluorine content of 0.64% by weight, a solids content of 38% by weight and a solvent content of 3.60% by weight NMP is charged to a reaction vessel at room temperature and is diluted with water (2) with uniform stirring. Subsequently n-butyl acrylate (3) and methyl methacrylate (4) are added with stirring. The initiator component, 2,2'-azoisobutyronitrile (5), is stirred in thoroughly thereafter. The reaction mixture is then heated to 80 to 85° C. and held at that temperature for 5 hours. Subsequently the dispersion is cooled to 25° C. This gives a fine, opaque hybrid dispersion having a solids content of about 45% by weight.

| 1. fluorine-modified polyurethane dispersion (A) | 400.00 g |
|---|---|
| 2. tap water | 72.12 g |
| 3. n-butyl acrylate | 20.27 g |
| 4. methyl methacrylate | 81.07 g |
| 5. 2,2'-azoisobutyronitrile | 1.27 g |

Example 2

The fluorine-modified polyurethane base dispersion (1) having a polymer-bonded fluorine content of 0.64% by weight, a solids content of 38% by weight and a solvent content of 3.60% by weight NMP is charged to a reaction vessel at room temperature and is diluted with water (2) with uniform stirring. Subsequently 3,3,4,4,5,5,6,6,7,7,8,8,8-tridecafluorooctyl methacrylate (3), methyl methacrylate (4) and n-butyl acrylate (5) are added with stirring. The initiator component, 2,2'-azoisobutyronitrile (6), is stirred in thoroughly thereafter. The reaction mixture is then heated to 80 to 85° C. and held at that temperature for 5 hours. Subsequently the dispersion is cooled to 25° C. This gives a fine, opaque hybrid dispersion having a solids content of about 45% by weight.

| 1. | fluorine-modified polyurethane dispersion (A) | 400.00 g |
|---|---|---|
| 2. | tap water | 18.40 g |
| 3. | 3,3,4,4,5,5,6,6,7,7,8,8,8-trideca-fluorooctyl methacrylate | 3.26 g |
| 4. | methyl methacrylate | 55.37 g |
| 5. | n-butyl acrylate | 6.51 g |
| 6. | 2,2'-azoisobutyronitrile | 0.80 g |

Example 3

The fluorine-modified polyurethane base dispersion (1) having a polymer-bonded fluorine content of 0.64% by weight, a solids content of 38% by weight and a solvent content of 3.60% by weight NMP is charged to a reaction vessel at room temperature and is diluted with water (2) with uniform stirring. Subsequently 3-{3,5,7,9,11,13,15-heptaisobutylpentacyclo-[9.5.1.1(3,9).1(5,15).1(7,13)]octasiloxan-1-yl}propyl methacrylate ($C_{35}H_{74}O_{14}Si_8$) (3), methyl methacrylate (4) and n-butyl acrylate (5) are mixed separately and then added with stirring. The initiator component, 2,2'-azoisobutyronitrile (6), is stirred in thoroughly thereafter. The reaction mixture is then heated to 80 to 85° C. and held at that temperature for 5 hours. Subsequently the dispersion is cooled to 25° C. This gives a fine, opaque hybrid dispersion having a solids content of about 45% by weight.

| | | |
|---|---|---|
| 1. | fluorine-modified polyurethane dispersion (A) | 400.00 g |
| 2. | tap water | 39.07 g |
| 3. | methacryloyl-functional POSS | 4.09 g |
| 4. | methyl methacrylate | 69.57 g |
| 5. | n-butyl acrylate | 8.18 g |
| 6. | 2,2'-azoisobutyronitrile | 1.00 g |

Example 4

The fluorine-modified polyurethane base dispersion (1) having a polymer-bonded fluorine content of 0.64% by weight, a solids content of 38% by weight and a solvent content of 3.60% by weight NMP is charged to a reaction vessel at room temperature and is diluted with water (2) with uniform stirring. Subsequently 3,3,4,4,5,5,6,6,7,7,8,8,9,9,10,10,10-heptadecafluorodecyl methacrylate (3), methyl methacrylate (4) and n-butyl acrylate (5) are added with stirring. The initiator component, 2,2'-azoisobutyronitrile (6), is stirred in thoroughly thereafter. The reaction mixture is then heated to 80 to 85° C. and held at that temperature for 5 hours. Subsequently the dispersion is cooled to 25° C. This gives a fine, opaque hybrid dispersion having a solids content of about 45% by weight.

| | | |
|---|---|---|
| 1. | fluorine-modified polyurethane dispersion (B) | 400.00 g |
| 2. | tap water | 18.19 g |
| 3. | 3,3,4,4,5,5,6,6,7,7,8,8,9,9,10,10,10-heptadecafluorodecyl methacrylate | 3.26 g |
| 4. | methyl methacrylate | 55.37 g |
| 5. | n-butyl acrylate | 6.51 g |
| 6. | 2,2'-azoisobutyronitrile | 0.80 g |

Example 5

The polyurethane base dispersion (1) having a solids content of 40% by weight and a solvent content of 3.73% by weight NMP is charged to a reaction vessel at room temperature and is diluted with water (2) with uniform stirring. Subsequently 3,3,4,4,5,5,6,6,7,7,8,8-tridecafluorooctyl methacrylate (3), methyl methacrylate (4) and n-butyl acrylate (5) are added with stirring. The initiator component, 2,2'-azoisobutyronitrile (6), is stirred in thoroughly thereafter. The reaction mixture is then heated to 80 to 85° C. and held at that temperature for 5 hours. Subsequently the dispersion is cooled to 25° C. This gives a fine, opaque hybrid dispersion having a solids content of about 45% by weight.

| | | |
|---|---|---|
| 1. | polyurethane dispersion (B) | 400.00 g |
| 2. | tap water | 87.56 g |
| 3. | 3,3,4,4,5,5,6,6,7,7,8,8,8-tridecafluorooctyl methacrylate | 4.09 g |
| 4. | methyl methacrylate | 67.11 g |
| 5. | n-butyl acrylate | 10.64 g |
| 6. | 2,2'-azoisobutyronitrile | 1.34 g |

Example 6

The polyurethane base dispersion (1) having a solids content of 40% by weight and a solvent content of 3.73% by weight NMP is charged to a reaction vessel at room temperature and is diluted with water (2) with uniform stirring. Subsequently 3-{3,5,7,9,11,13,15-heptaisobutylpentacyclo[9.5.1.1(3,9).1(5,15).1(7,13)]octa-siloxan-1-yl}propyl methacrylate ($C_{35}H_{74}O_{14}Si_8$) (3), methyl methacrylate (4) and 3,3,4,4,5,5,6,6,7,7,8,8,8-tridecafluorooctyl methacrylate (5) are mixed separately and then added with stirring. The initiator component, 2,2'-azoisobutyronitrile (6), is stirred in thoroughly thereafter. The reaction mixture is then heated to 80 to 85° C. and held at that temperature for 5 hours. Subsequently the dispersion is cooled to 25° C. This gives a fine, opaque hybrid dispersion having a solids content of about 45% by weight.

| | | |
|---|---|---|
| 1. | polyurethane dispersion (B) | 400.00 g |
| 2. | tap water | 40.37 g |
| 3. | methacryloyl-functional POSS | 2.74 g |
| 4. | methyl methacrylate | 60.34 g |
| 5. | 3,3,4,4,5,5,6,6,7,7,8,8,8-tridecafluorooctyl methacrylate | 5.49 g |
| 6. | 2,2'-azoisobutyronitrile | 0.81 g |

Example 7

The polyurethane base dispersion (1) having a solids content of 40% by weight and a solvent content of 3.73% by weight NMP is charged to a reaction vessel at room temperature and is diluted with water (2) with uniform stirring. Subsequently 3,3,4,4,5,5,6,6,7,7,8,8,9,9,10,-10,10-heptadecafluorodecyl methacrylate (3), methyl methacrylate (4) and n-butyl acrylate (5) are added with stirring. The initiator component, 2,2'-azoisobutyronitrile (6), is stirred in thoroughly thereafter. The reaction mixture is then heated to 80 to 85° C. and held at that temperature for 5 hours. Subsequently the dispersion is cooled to 25° C. This gives a fine, opaque hybrid dispersion having a solids content of about 45% by weight.

| | | |
|---|---|---|
| 1. | polyurethane dispersion (B) | 400.00 g |
| 2. | tap water | 87.19 g |
| 3. | 3,3,4,4,5,5,6,6,7,7,8,8,9,9,10,10,10-heptadecafluorodecyl methacrylate | 7.47 g |
| 4. | methyl methacrylate | 87.47 g |
| 5. | n-butyl acrylate | 11.73 g |
| 6. | 2,2'-azoisobutyronitrile | 1.04 g |

The invention claimed is:

1. A polyurethane-polymer hybrid dispersion prepared by a process comprising the steps of:
   a) preparing a dispersion component or binder component based on an aqueous solution or dispersion of an optionally hydroxy- or amino-functional polyurethane-polymer hybrid having fluorinated or unfluorinated side chains, by
   $a_1$) admixing 5 to 100 parts by weight of a laterally fluorine-modified, anionically stabilized polyurethane base dispersion (A) having, a polymer-bonded fluorine content of up to 5% by weight, at least one of a hydroxyl number of amine number of 0 to 250 mg KOH/g, a solids content of 20% to 60% by weight, a solvent content of 0 to 20% by weight, and a number average molecular weight of 5,000 to 100,000 daltons with 3 to 300 parts by weight of a monomer component (B) comprising
   (i) 1 to 100 parts by weight of one or more unsaturated monomers (B)(i) having one or more free-radically polymerizable double bonds, selected from the group consisting of acrylic acid, methacrylic acid, styrene, and derivatives thereof, or
   (ii) 1 to 100 parts by weight of one or more unsaturated fluorine-modified monomers (B)(ii) having one or more free-radically polymerizable double bonds, selected from the group consisting of an alkyl (per) fluoro (meth)acrylate, a (per)fluoroalkyl (meth)acrylate a (per)fluoroalkyl (per)fluoro(meth)acrylate, a reaction product of 1-(1-isocyanato-1-methylethyl)-3-(2-propenyl)benzene (m-TMI) and a perfluoroalkyl alcohol, or
   (iii) 1 to 100 parts by weight of one or more unsaturated optionally fluorine-modified monomers (B)(iii) having one or more free-radically polymerizable double bonds, selected from the group consisting of polyhedral oligomeric polysilsesquioxanes (POSS) of the formula $(RSiO_{1.5})_n$ with n=4, 6, 8, 10, 12; and R is an organic radical having 1 to 100 C atoms and 0 to 50 N, 0 to 50 O, or 0 to 50 F, 0 to 50 Si or 0 to 50 S atoms and a number average molecular weight of 250 to 25,000 daltons,
   with 0.01 to 10 parts by weight of an initiator component (C), comprising at least one lipophilic free-radical initiator having one or more thermally labile azo or peroxo groups, and 0 to 200 parts by weight of water, wherein the monomer component (B), the initiator component (C), and the water may optionally be metered in simultaneously, successively or as a mixture to the polyurethane base dispersion (A), and subsequently
   $a_2$) conducting, in the reaction mixture from stare $a_1$), as a result of the thermal decomposition of component (C), a free-radical polymerization of component (B) within micelles of the polyurethane base dispersion (A),
   and, optionally,
   b) subsequently reacting the dispersion or binder component formed from components (A) to (C) from stage $a_2$) with 20 to 100 parts by weight of a crosslinker component (D) (curing agent), wherein said crosslinker component or curing agent (D) is a water-dispersible polyisocyanate having at least one of an aliphatically, cycloaliphatically, or aromatically attached isocyanate group, wherein the polyisocyanate may optionally contain from 0 to 25% by weight of an organic solvent, wherein component (A) is a polyurethane dispersion which contains as structural groups laterally fluorine-modified macromonomers based on a reaction product of
a) a perfluoroalkyl alcohol, a diisocyanate, or diethanolamine, a perfluoroalkyl alcohol having terminal methylene groups of the formula

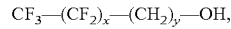
$$CF_3-(CF_2)_x-(CH_2)_y-OH,$$

wherein
x is from 3-20 and
y is from 1-6
or a hexafluoropropene oxide (HFPO) oligomer alcohol of the formula,

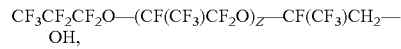
$$CF_3CF_2CF_2O-(CF(CF_3)CF_2O)_Z-CF(CF_3)CH_2-OH,$$

wherein
Z is from 1-10,
or a mixture of thereof, or
b) a perfluoroalkylalkene and diethanolamine, or a perfluoroalkylalkene having terminal a methylene group (hydrocarbon spacer) of the formula

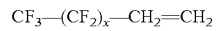
$$CF_3-(CF_2)_x-CH_2=CH_2$$

wherein
x is from 3-20
or a mixture thereof, or
c) an alkyl (per)fluoro(meth)acrylate, a (per)fluoroalkyl (meth)acrylate, a (per)fluoroalkyl (per)fluoro(meth) acrylate and diethanolamine, or
d) a (per)fluoroalkylalkylene oxide N-methylethanolamine or diethanolamine.

2. A polyurethane-polymer hybrid dispersion prepared by a process comprising the steps of:
   a) preparing a dispersion component or binder component based on an aqueous solution or dispersion of an optionally hydroxy- or amino-functional polyurethane-polymer hybrid having fluorinated or unfluorinated side chains, by
   $a_1$) admixing 5 to 100 parts by weight of a laterally fluorine-modified, anionically stabilized polyurethane base dispersion (A) having, a polymer-bonded fluorine content of up to 5% by weight, at least one of a hydroxyl number of amine number of 0 to 250 mg KOH/g, a solids content of 20% to 60% by weight, a solvent content of 0 to 20% by weight, and a number average molecular weight of 5,000 to 100,000 daltons with 3 to 300 parts by weight of a monomer component (B) comprising
   (i) 1 to 100 parts by weight of one or more unsaturated monomers (B)(i) having one or more free-radically polymerizable double bonds, selected from the group consisting of acrylic acid, methacrylic acid, styrene, and derivatives thereof, or
   (ii) 1 to 100 parts by weight of one or more unsaturated fluorine-modified monomers (B)(ii) having one or more free-radically polymerizable double bonds, selected from the group consisting of an alkyl (per) fluoro (meth)acrylate, a (per)fluoroalkyl (meth)acrylate a (per)fluoroalkyl (per)fluoro(meth)acrylate, a reaction product of 1-(1-isocyanato-1-methylethyl-3-(2-propenyl)benzene (m-TMI) and a perfluoroalkyl alcohol, or
   (iii) 1 to 100 parts by weight of one or more unsaturated optionally fluorine-modified monomers (B)(iii) having one or more free-radically polymerizable double bonds, selected from the group consisting of polyhedral oligomeric polysilsesquioxanes (POSS) of the formula $(RSiO_{1.5})_n$ with n=4, 6, 8, 10, 12; and R is an organic radical having 1 to 100 C atoms and 0 to 50 N, 0 to 50 O, or 0 to 50 F, 0 to 50 Si or 0 to 50 S atoms and a number average molecular weight of 250 to 25,000 daltons, with 0.01 to 10 parts by weight of an initiator component (C), comprising at least one lipophilic free-radical initiator having one or more thermally labile azo or peroxo groups, and 0 to 200 parts by weight of water, wherein the monomer component (R), the initiator component (C), and the water may optionally be metered in simultaneously, successively or as a mixture to the polyurethane base dispersion (A), and subsequently $a_2$) conducting, in the reaction mixture from stage $a_1$), as a result of the thermal decomposition of component (C), a free-radical polymerization of component (B) within micelles of the polyurethane base dispersion (A), and, optionally, b) subsequently reacting the dispersion or binder component formed from components (A) to (C) from stage $a_2$) with 20 to 100 parts by weight of a crosslinker component (D) (curing agent), wherein said crosslinker component or curing agent (D) is a water-dispersible polyisocyanate having at least one of an aliphatically, cycloaliphatically, or aromatically attached isocyanate group, wherein the polyisocyanate may optionally contain from 0 to 25% by weight of an organic solvent.

wherein component (B)(iii) is made a reactive polyhedral oligomeric polysilsesquioxane (POSS) of the formula $(RSiO_{1.5})_8$ wherein R is at least one of methacryloyloxypropyl, $CH_2CH_2CF_2CF_2CF_2CF_2CF_2CF_3$, a H, $C_1$-$C_{25}$ alkyl, $C_3$-$C_{25}$ cycloalkyl, $C_6$-$C_{30}$ aryl, $(CH_2)_3$ $(OCH_2CH_2)_n OMe$, aminopropyl, epoxypropyl, dimethoxysilyloxy, isocyanatopropyl, or triethoxysilylpropyl.

3. A polyurethane-polymer hybrid dispersion prepared by a process comprising the steps of:

a) preparing a dispersion component binder component based on an aqueous solution or dispersion of an optionally hydroxy- or amino-functional polyurethane-polymer hybrid having fluorinated or unfluorinated side chains, by $a_1$) admixing 5 to 100 pads by weight of a laterally fluorine-modified, anionically stabilized polyurethane base dispersion (A) having, a polymer-bonded fluorine content of up to 5% by weight, at least one of a hydroxyl number of amine number of 0 to 250 mg KOH/g, a solids content of 20% to 60% by weight, a solvent content 0 to 20% by weight, and a number average molecular weight of 5,000 to 100,000 daltons with 3 to 300 parts by weight of a monomer component (B) comprising (i) 1 to 100 parts by weight of one or more unsaturated monomers (B)(i) having one or more free-radically polymerizable double bonds, selected from the group consisting of acrylic acid, methacrylic acid, styrene, and derivatives thereof, or (ii) 1 to 100 parts by weight of one or more unsaturated fluorine-modified monomers (B)(ii) having one or more free-radically polymerizable double bonds, selected from the group consisting of an alkyl (per) fluoro (meth)acrylate, a (per)fluoroalkyl (meth)acrylate a (per)fluoroalkyl (per)fluoro(meth)acrylate, a reaction product of 1-(1-isocyanato-1-methylethyl)-3-(2-propenyl)benzene (m-TMI) and a perfluoroalkyl alcohol, or (iii) 1 to 100 parts by weight of one or more unsaturated optionally fluorine-modified monomers (B)(iii) having one or more free-radically polymerizable double bonds, selected from the group consisting of polyhedral oligomeric polysilsesquioxanes (POSS) of the formula $(RSiO_{1.5})_n$ with n=4, 6, 8, 10, 12; and R is an organic radical having 1 to 100 C atoms and 0 to 50 N, 0 to 50 O, or 0 to 50 F, 0 to 50 Si or 0 to 50 S atoms and a number average molecular weight of 250 to 25,000 daltons, with 0.01 to 10 parts by weight of an initiator component (C), comprising at least one lipophilic free-radical initiator having one or more thermally labile azo or peroxo groups, and 0 to 200 parts by weight of water, wherein the monomer component (B), the initiator component (C), and the water may optionally be metered in simultaneously, successively or as a mixture to the polyurethane base dispersion (A), and subsequently $a_2$) conducting, in the reaction mixture from stage $a_1$), as a result of the thermal decomposition of component (C), a free-radical polymerization of component (B) within micelles of the polyurethane base dispersion (A), and, optionally, b) subsequently reacting the dispersion or binder component formed from components (A) to (C) from stage $a_2$) with 20 to 100 parts by weight of a crosslinker component (D) (curing agent), wherein said crosslinker component or curing agent (D) is a water-dispersible polyisocyanate having at least one of an aliphatically, cycloaliphatically, or aromatically attached isocyanate group, wherein the polyisocyanate may optionally contain from 0 to 25% by weight of an organic solvent, wherein component (B)(iii) is a reactive polyhedral oligomeric polysilsesquioxane (POSS) of the formula $(R_a X_b SiO_{1.5})_m$ wherein a is 0 or 1, b is 0 or 1, a+b=1, m is 2, 6, 8, 10, or 12, and R is H, alkyl, cycloalkyl, alkenyl, cycloalkenyl, alkynyl or cycloalkynyl group or polymer unit, each of which are substituted or unsubstituted, or further functionalized polyhedral oligomeric silicon-oxygen cluster units, which are attached via a polymer unit or a bridging unit, X is oxy, hydroxy, alkoxy, carboxy, silyl, alkylsilyl, alkoxysilyl, siloxy, alkylsiloxy, alkoxysiloxy, silylalkyl, alkoxysilylalkyl, alkylsilylalkyl, halogen, epoxy, ester, fluoroalkyl, isocyanate, blocked isocyanate, acrylate, methacrylate, nitrile, amino, phosphine, a polyether group, or a substituent of type R containing at least one such group of type X, wherein the substituents of type R and the substituent of type X are the same or different.

4. The polyurethane-polymer hybrid dispersion of claim 1, wherein component (C) is a free-radical initiator which has a half-life of one hour at a decomposition temperature in the range from 40 to 120° C.

5. The polyurethane-polymer hybrid dispersion of claim 1, wherein component (C) is 2,2'-azobis(2-methylbutyronitrile) or 2,2'-azobis(2-methylpropionitrile).

6. The polyurethane-polymer hybrid dispersion of claim 1, wherein the initiator/monomer molar ratio of components (B) and (C) is set at a level of 0.001 to 0.05.

7. The polyurethane-polymer hybrid dispersion of claim 1, wherein in the anionically modified polyurethane hybrid polymer formed from components (A) to (C) the amount of carboxylate or sulfonate groups is set at 5 to 25 meq·(100 g)$^{-1}$ and the acid number at 2.5 to 15 meq KOH·g$^{-1}$.

8. The polyurethane-polymer hybrid dispersion of claim 1, wherein the solids content in terms of fluorine-modified polyurethane hybrid polymer consisting of components (A) to (C) is set at 30% to 70% by weight based on the total amount of the polyurethane-polymer hybrid dispersion.

9. The polyurethane-polymer hybrid dispersion of claim 1, wherein the ratio of the proportional solids contents of (fluorine-modified) polyurethane resin from component (A) and (fluorine-modified) polymer resin from components (B) and (C) is set at 20%:80% to 80%:20% by weight.

10. The polyurethane-polymer hybrid dispersion of claim 1, wherein the polyurethane dispersions or polyurethane-polymer hybrid dispersions contain less than 10% by weight of organic solvents.

11. The polyurethane-polymer hybrid dispersion of claim 1, wherein the average particle size of the micelles amounts to 50 to 500 nm.

12. The polyurethane-polymer hybrid dispersion of claim 1, wherein the average molar mass (number average) is from 50,000 to 500,000 daltons.

13. The polyurethane-polymer hybrid dispersion of claim 1, wherein the ratio of crosslinker component (D) to the binder component comprising components (A) to (C) is from 1:3 to 1:5.

14. A method of preparing the polyurethane-polymer hybrid dispersion of claim 1, comprising:
preparing a dispersion component by
a$_1$) optionally diluting an optionally fluorine-modified polyurethane base dispersion (A) with water and admixing it with a pre-prepared mixture of components (B) and (C) and also with water, it being possible to meter in the monomer component (B) or its individual constituents, the initiator component (C), and the water simultaneously, successively or in a mixture to the polyurethane base dispersion (A), and finally
a$_2$) carrying out a free-radical polymerization of component (B) by means of the thermal decomposition of component (C),
and optionally, by
b) reacting the binder component formed from components (A) to (C) from stage a$_2$) subsequently with 20 to 100 parts by weight of a crosslinker component (D).

15. The method of claim 14, wherein reaction stage a$_1$) is carried out at a temperature of 15 to 35° C.

16. The method of claim 14, wherein reaction stage a$_2$) is carried out at a temperature difference of ±10° C. relative to the temperature at which component (C) has a half-life of 1 hour.

17. The method of claim 14, wherein reaction stage a$_2$) is carried out at a temperature of 80±10° C. when component (C) is 2,2'-azobisisobutyronitrile.

18. The method of claim 14, wherein the free-radical polymerization in reaction stage a$_2$) is carried out without further emulsifiers.

19. The method of claim 14, wherein reaction stage b) is carried out at a temperature of 15 to 35° C.

20. The polyurethane-polymer hybrid dispersion of claim 1, wherein component (A) is an optionally hydroxy- or amino-functionalized polyurethane dispersions based on an optionally hydrophodically modified polyalkylene glycol, an aliphatic or aromatic polyester, a polycaprolactone, a polycarbonate, α,ω-polybutadienepolyol, an α,ω-polymethacrylatediol, an α,ω-dihydroxyalkylpolydimethylsiloxane, a macromonomer, a telechele, a hydroxy-functional epoxy resin, an oxidatively drying alkyd resin based on a bisepoxide and an unsaturated fatty acid, a hydroxy-functional polysulfide or a mixture thereof.

21. A method comprising utilizing the polyurethane-polymer hybrid dispersion of claim 20 in one-component or two-component form.

22. The method of claim 21, wherein for a two-component application, wherein formulated or unformulated polyurethane-polymer hybrid dispersion is the binder component and a water-emulsifiable (paint) polyisocyanate is the curing component.

23. The method of claim 21, wherein the dispersion is used to form a permanent oil- and water-repellent surface treatment or modification of a mineral or a nonmineral substrate.

24. The method of claim 23, wherein said substrate is an
a) inorganic surface, such as porous, absorbent, rough, and polished building material, a construction material selected from concrete, gypsum, silica or a silicate, an artificial stone, a natural stone, clay, cement, brick, an enamel, a filler, a pigment, glass, ceramic, a metal or a metal alloy, or
b) an organic surface, such as wood, a woodbase material, wood veneer, a glass fiber-reinforced plastic (GRP), a plastic, leather, a natural fiber, a polar organic polymer or a composite material.

25. A coated substrate comprising a substrate coated with a coating comprising the dispersion of claim 20, wherein said coating is at least one of
an antigraffiti coating,
an anti soiling coating,
an easy to clean coating,
a balcony coating, a roof coating, a baking varnish, an ink, a paint, a masonry paint, a floor coating, a light-, medium- or high-duty industrial floor, a car park surfacing, a sports floor,
a seal,
a prefabricated concrete component,
a concrete molding,
a tile or joint,
an adhesive or sealant
a soundproofing for a wall,
corrosion control,
renders or decorative plaster,
an exterior insulation and finishing systems (EIFS) anti exterior insulation systems (US), a coating for an auto, part, a coil coating, a baking varnish, a glass frontage, a glass surface, a ceramic, a sanitary ceramic, a leather dressing, a surface-modified filler, a surface modified pigment, a paper coating, a rotor for a wind turbine, or a marine paint.

\* \* \* \* \*